United States Patent Office 3,046,301
Patented July 24, 1962

3,046,301
METHOD OF MAKING CHLORAMBUCIL
Arthur P. Phillips, Tuckahoe, and John W. Mentha, Hartsdale, N.Y., assignors to Burroughs Wellcome & Co. (U.S.A.) Inc., Tuckahoe, N.Y., a corporation of New York
No Drawing. Filed Oct. 29, 1959, Ser. No. 849,438
8 Claims. (Cl. 260—471)

This invention relates to a novel and improved method for the manufacture of chlorambucil.

The compound γ-[4-bis - chloroethyl)aminophenyl] butyric acid, known medically as "Chlorambucil," has become of therapeutic importance in the treatment of chronic lymphocytic and other forms of leukemia. It has previously been synthesized by the following route:

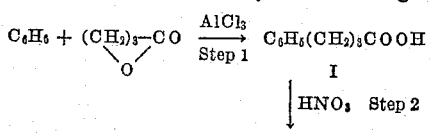

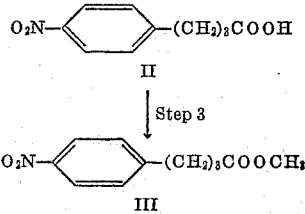

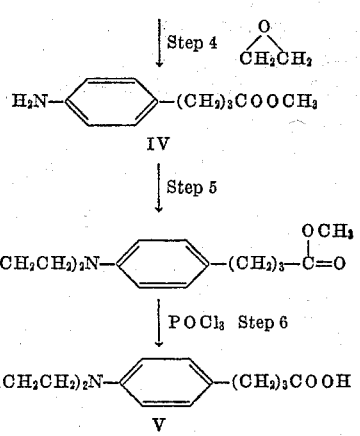

An important intermediate in the preparation of the final product chlorambucil (V) is methyl γ-[p-aminophenyl] butyrate (IV),) (see the Clinical Use of Chlorambucil A, Critical Study, D. G. Miller et al., Sloan-Kettering Institute for Cancer Research, N.E. J. Med. 261: 525–535, September 1959). Of the various portions of this synthesis, the least satisfactory is the nitration step (2) to produce the intermediate para nitrophenyl butyrate II. Here a mixture of isomers is formed and II is isolated in rather poor yield after laborious fractionations. It is the object of the present invention to provide an improved method of manufacturing the intermediate IV directly in a far more expeditious fashion with greatly improved yield and with marked saving in cost.

It is known (English et al., J. Amer. Chem. Soc., 67, 2263 (1945); Papa et al., ibid., 70, 3356 (1948) that Friedel-Crafts reactions can be run successfully employing acetanilide on the one hand and either succinic or maleic anhydride on the other:

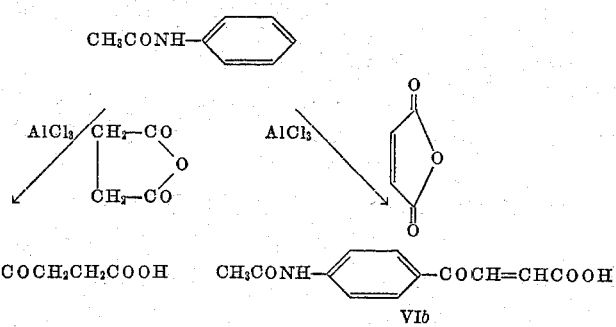

In these reactions substitution is exclusively para to the acetamido group so that no separation of isomers is necessary. The compounds VIa and VIb are thus quite readily available.

We have now discovered that compounds VIa and VIb, which differ only by the presence of extra unsaturation in VIb, can be converted to the important intermediate methyl γ-[para-aminophenyl] butyrate IV in one operation and in virtually quantitative fashion by the following reaction:

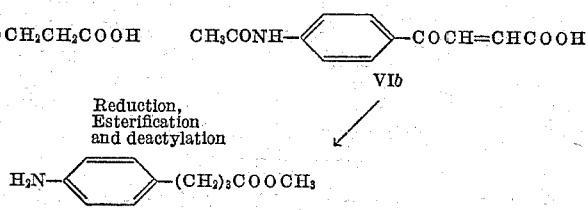

In a further aspect, the invention provides for the reduction of the compound:

to the compound:

by hydrogenation in the presence of a hydrogenation catalyst.

The starting material (VIa or VIb) is dissolved in methanol containing a substantial amount of a strong acid and is shaken with hydrogen gas and a suitable hydrogenation catalyst. If VIb is the starting material, it is presumably reduced first to VIa. Subsequent reduction replaces the keto oxygen with two hydrogen atoms. At the same time the carboxyl group is esterified and the acetyl group removed. As a result IV is obtainable in two steps from acetanilide and in an over-all yield of over 50% whereas by the older synthesis IV required three steps with an over-all yield of 12–15% from phenylbutyric acid (which is less available than acetanilide).

The hydrogenation catalyst must be one stable (and effective) in an acid medium. For this purpose palladium and platinum catalysts are suitable. In practice, we have found palladized charcoal (5% or 10% metal by weight) especially convenient and efficient.

The quantity of acid present in the reaction medium is diminished during the reaction by one equivalent which is required to neutralize the amino group liberated by removal of acetyl. The amount of the mineral acid must therefore be in excess of the molar equivalent of VIa or VIb employed. Since the esterification and de-acetylation steps are acid catalyzed, it is preferable to employ a substantial excess. We have found that two equivalents of hydrogen chloride (100% excess) are sufficient but a larger or a somewhat smaller amount can also be used. For the purposes of this work hydrogen chloride is adequate and has the further advantage of being easily removed by evaporation. Sulfuric and perchloric acids are satisfactory but require separate neutralization before evaporation of solvent. Nitric acid is unsuitable as being itself reduced and hydrogen bromide since it reacts with methanol. Phosphoric acid is usable but offers no advantages.

Having now described this invention in general terms, the following examples describe specifically its operation.

EXAMPLE 1

*Preparation of Methyl γ-(p-Aminophenyl) Butyrate*

(A) *From β-(p-acetaminobenzoyl) propionic acid.*—A solution containing 23.5 g. (0.1 M) of β-(p-acetaminobenzoyl) propionic acid, 30 cc. of 20% methanolic hydrogen chloride, 4 g. of 5% Pd-C catalyst and 120 cc. of methanol was shaken in a Burgess-Parr hydrogenation apparatus at room temperature and 2–3 atmospheres of $H_2$ pressure. Hydrogen uptake was rapid and 0.2 mole of $H_2$ was absorbed and reduction completed within 1–1½ hours. After removal of the catalyst the mixture was refluxed on a steam bath for 2–3 hours. After concentration of the methanol solution the hydrochloride was precipitated in crystalline form by addition of ether, yield 22 g. (95–100%), M.P. 152–154° C.

Liberation of the free amino ester in aqueous solution with alkali gave a product which melted at 41–42° C. after crystallization from hexane or pentane.

(B) *From β-(p-acetaminobenzoyl) acrylic acid.*—When the product from acetanilide and maleic acid was reduced as above the reduction went rapidly and completely as before taking one additional mole of $H_2$ per mole as required. The yield was upwards of 90%.

EXAMPLE 2

In a hydrogenator was placed 210 g. of β-(p-acetamidobenzoyl) propionic acid (VIa). To it was added 440 cc. of methanol and 360 cc. of a 20% (wt./vol.) solution of hydrogen chloride in methanol, and 18 g. of 5% palladized charcoal. The hydrogenator was closed, evacuated and filled with hydrogen. After 2½ hours shaking 1.8 mols of hydrogen had been absorbed. The reduction was allowed to proceed further till hydrogen absorption was complete and the contents of the hydrogenator was filtered from the catalyst. To the filtrate was added 180 cc. of 20% hydrogen chloride in methanol and the solution was refluxed two hours. Solvent was distilled off in vacuo and the crystalline residue was dissolved in 1350 cc. of ice-water. To this solution was added slowly with cooling and stirring, 225 cc. of 40% sodium hydroxide solution. The precipitated semi-solid oil was taken into ether (three 900 cc. portions) and the combined extract was dried over potassium carbonate. The desiccant was removed by filtration and the solvent was distilled off using vacum at the end. The residual material weighed 162 g. (94%) and was sufficiently pure for the purposes of this synthesis. On recrystallization from ether-pentane mixture there was obtained 144 g. melting at 40–42° C.

What we claim is:

1. The process of preparing methyl γ-[p-aminophenyl] butyrate which comprises reacting in the presence of hydrogen and a hydrogenation catalyst "selected from the class consisting of palladium and platinum", a compound selected from the class consisting of β-p-acetamidobenzoyl-propionic acid and β-p-acetamidobenzoyl-acrylic acid dissolved in methanolic solution containing excess mineral acid to the stoichiometric quantity.

2. The process of preparing methyl γ-[p-aminophenyl] butyrate which comprises reacting in the presence of hydrogen and a hydrogenation catalyst "selected from the class consisting of palladium and platinum". β-p-acetamidobenzoyl-propionic acid dissolved in methanolic solution containing excess mineral acid to the stoichiometric quantity.

3. The process of preparing methyl γ-[p-aminophenyl] butyrate which comprises reacting in the presence of hydrogen and a hydrogenation catalyst "selected from the class consisting of palladium and platinum". β-p-acetamidobenzoyl-acrylic acid dissolved in methanolic solution containing excess mineral acid to the stoichiometric quantity.

4. The process set forth in claim 2 using a noble metal catalyst.

5. The process set forth in claim 3 using a noble metal catalyst.

6. The process set forth in claim 2 using a palladized charcoal catalyst.

7. The process set forth in claim using a palladized charcoal catalyst.

8. The process set forth in claim 1 wherein the mineral acid is hydrogen chloride.

References Cited in the file of this patent

UNITED STATES PATENTS

| | | |
|---|---|---|
| 2,418,925 | Clapp et al. | Apr. 15, 1947 |
| 2,447,998 | Clapp et al. | Aug. 24, 1948 |
| 2,767,210 | Morren | Oct. 16, 1956 |
| 2,868,770 | Temin | Jan. 13, 1959 |

OTHER REFERENCES

Groggins: "Unit Processes in Organic Synthesis," pages 575, 576, 579, 583, 585, McGraw-Hill, 1958.

UNITED STATES PATENT OFFICE
CERTIFICATE OF CORRECTION

Patent No. 3,046,301  
July 24, 1962

Arthur P. Phillips et al.

It is hereby certified that error appears in the above numbered patent requiring correction and that the said Letters Patent should read as corrected below.

Column 1, the formula

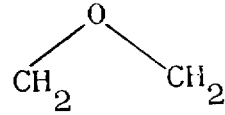

should be adjacent Step 5 instead of adjacent Step 4.

Signed and sealed this 16th day of April 1963.

(SEAL)
Attest:

ERNEST W. SWIDER
Attesting Officer

DAVID L. LADD
Commissioner of Patents